April 14, 1953 J. L. WAITE 2,634,944
REPLACEMENT VALVE UNIT
Filed Nov. 10, 1948

INVENTOR.
JACKSON L. WAITE
BY
West & Oldham
ATTORNEYS

Patented Apr. 14, 1953

2,634,944

UNITED STATES PATENT OFFICE 2,634,944

REPLACEMENT VALVE UNIT

Jackson L. Waite, Cleveland, Ohio, assignor to Waite Corporation, a corporation of Ohio Application November 10, 1948, Serial No. 59,213

12 Claims. (Cl. 251—40)

This invention relates to valve mechanisms, especially to a replacement valve unit which is adapted to be substituted in existing faucets for the original valve mechanism employed in a faucet such as is usually used with sinks.

As is well known to those who are acquainted with the art to which this invention relates, faucets as usually constructed are provided each with an integral valve seat formed with the inlet branch or channel and surrounding the delivery end of the latter while the valve proper consists of a gasket or washer of rubber or similar material secured to a valve stem which is threaded into a neck opposed to the aforesaid valve seat whereby, on rotation of the valve stem, the gasket or washer may be brought into and out of engagement with the said seat. The lives of the valve gaskets or washers on said stems are of short duration, causing leakage between the same and their seats and necessitating their frequent removal and replacement.

A further problem which arises in faucets after extended periods of use is that the valve seats may become scored or pitted or encumbered with rust so that it is difficult for even a new washer to provide a tight seal therewith.

It is the general object of the present invention to avoid and overcome the foregoing problem and to provide a replaceable valve unit which may be substituted for the valve in substantially all conventional faucets.

Another object of the invention is to provide a new valve seat for an old faucet, and to provide means for sealing of the old valve seat in a faucet.

Another object of the invention is to provide a valve unit which functions without the use of internal screw threads and which produces a minimum of frictional contact between a valve and a valve seat.

Yet another object of the invention is to provide a replacement valve unit of inexpensive but sturdy construction which valve unit will fit substantially all conventional types of home faucets.

The foregoing and other objects and advantages of the invention will be made more apparent as the specification proceeds.

Attention is directed to the accompanying drawings for a better understanding of the invention, and in such drawings.

Figure 1:
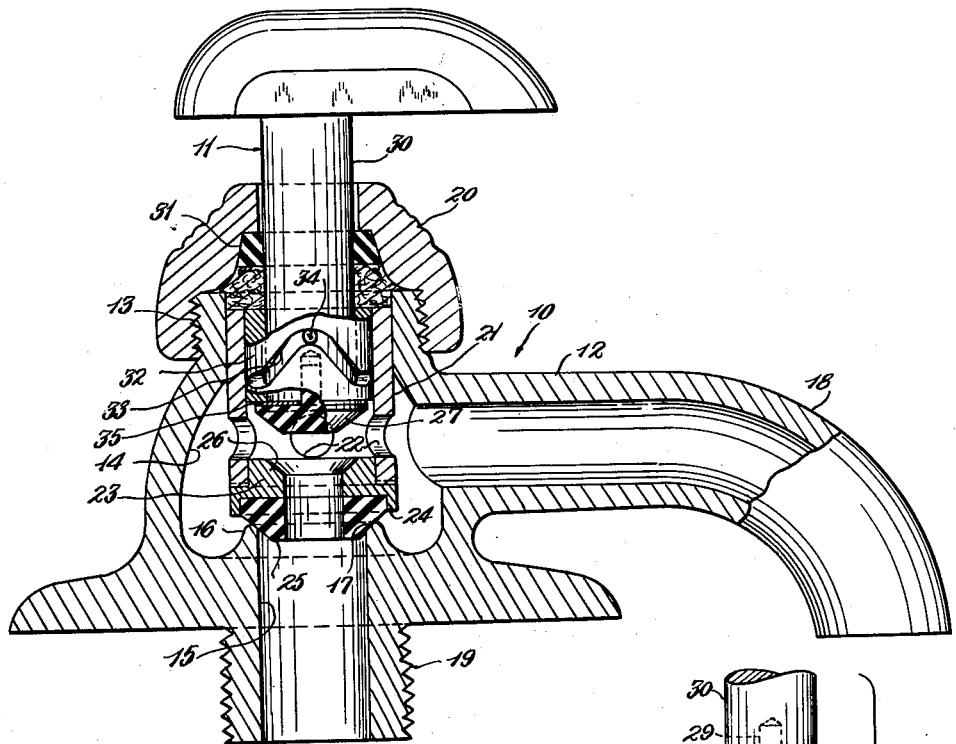
Fig. 1 is a vertical section, partially in elevation, of a valve unit of the invention shown engaged with a conventional faucet.

Reference now is directed to the details of the structure shown in the accompanying drawings wherein corresponding reference numerals in the drawings and specifications indicate corresponding parts. A faucet 10 of a substantially conventional construction is shown provided with a valve unit 11 of the invention. The faucet 10 includes a fucet body 12 which has a neck 13 extending therefrom at one end thereof and which has a bore extending therethrough. A chamber 14 of greater diameter than the bore of the neck 13 is provided within the faucet body 12 at the lower end of the neck 13. An inlet channel or opening 15 is provided in the base of the chamber 14 and this opening 15 is provided by a tubular boss 16 which extends upwardly from the base of the chamber 14 and forms an annular seat at 17. This seat 17 thus is positioned within the chamber 14 and is opposed to the bore of the neck 13. An outlet spigot 18 is formed in the faucet body 12 and connects to the chamber 14 intermediate the vertical distance in the faucet between the seat 17 and the lower portion of the neck 13. A conventional threaded boss 19 is shown formed on the lower portion of the faucet body 12 to facilitate its engagement with a water conduit or other member. A bonnet nut 20 engages with the neck 13 to enclose such end of the faucet body. It will be realized that the faucet body and the general construction of the faucet 10 is conventional and that substantially all faucets in use today are of this same general construction. Any of several different types of flow control members could be provided within the chamber 14 for controlling flow of liquid through the inlet 15.

As a salient feature of the persent invention, the valve unit 11 is provided for insertion into the faucet body 12 to seal off the old seat 17 therein and to provide a new valve seat for such faucet. This valve unit 11 includes an outer, tubular sleeve or barrel 21 which has at least one outlet opening 22 formed in the side thereof in the portion of the barrel 21 which extends into the chamber 14 since the upper end of the barrel 21 is snugly engaged with the bore of the neck 13. The outer barrel 21 is shown carrying apertured washer means or other conventional article, such as a washer 23 at the lower end thereof. The washer is metallic and is shown as having an upper cylindrical section which is in telescoped engagement with the lower end of the barrel 21 and which has a cylindrical, downwardly directed edge flange 24 provided thereon which flange 24 usually is of the same diameter as the outer portion of the barrel 21. Seated against the base portion of the washer 23 is a suitable gasket 25 with the periphery of the gasket 25 being at least partially confined by the edge flange 24 to prevent spreading or flow of the material forming the gasket. The gasket 25 is designed to seat against the seat 17 and seal same completely and to permit liquid flow through the faucet 10 only through the bores of the washer 23 and the gasket 25. Preferably a new valve seating surface is provided on the washer 23 at the upper surface thereof as indicated by the numeral 26.

Flow of liquid past the new seat 26 is controlled by means of a valve 27, which usually is formed from resilient material such as synthetic rubber or other equivalent material and which has a centering stud 28 extending upwardly from the base portion thereof. The centering stud 28 is received in and engaged with a recess 29 formed in the lower end of a valve stem member 30. The valve stem member 30 extends through the bonnet nut 20 and is sealed with relation to the faucet 10 by means of conventional packing 31 which is forced against the valve stem 30 by such bonnet nut.

The position of the valve stem 30 with relation to the seat 26 is controlled by means of corresponding cam elements that are formed on the valve stem and an inner sleeve or barrel 32 which is positioned within the barrel 21 at the upper end thereof. The inner barrel 22 is shown as having substantially an inverted U-shaped camway 33 formed therein and an extension pin 34 is secured to or formed integrally with the valve stem 30 and engages with the camway 33 so that arcuate movement of the valve stem causes vertical movement of the same. At both extremities of the camway 33 the valve stem is adapted to position the valve 27 tightly against the seat 26. It will be noted that the valve 27 is freely carried by the valve stem in the recess 29 but the pressure of the liquid in the faucet 10 will normally retain the valve tightly against the lower end of the valve stem. Usually a metallic washer 35 is provided for the base portion of the valve 27 where it seats against the end of the valve stem 30.

Figures 2, 3, 4:
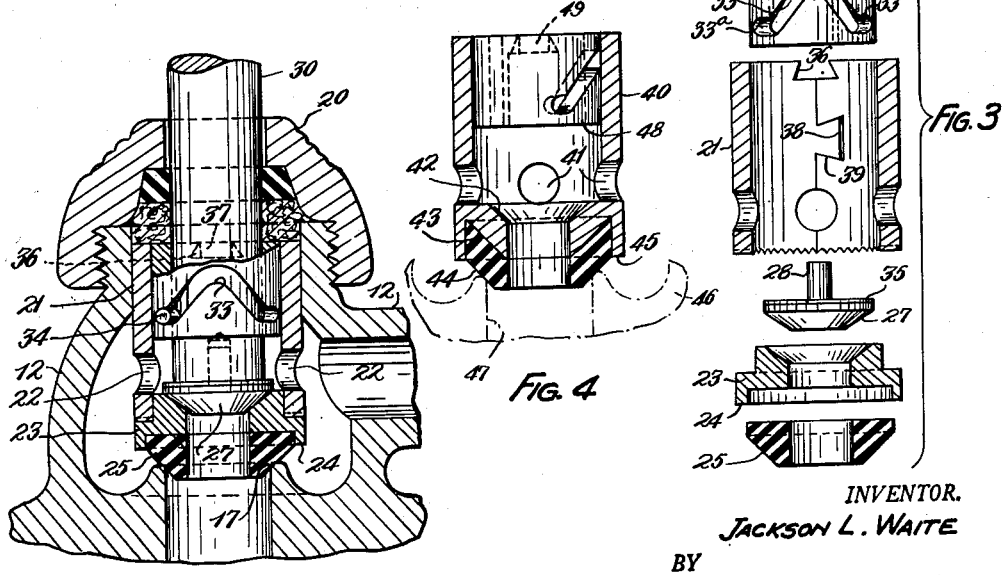
Fig. 2 is a section similar to Fig. 1 of the valve of Fig. 1 in a different operating position.
Fig. 3 is an exploded vertical section, partially in elevation, of the components of the valve unit.
Fig. 4 is a fragmentary section of a modified type of valve unit.

Fig. 3 shows that the outer barrel 21 is longitudinally slit and that a dovetailed notch 36 is formed in the upper edge thereof with a portion of the notch being formed on each end of a strip used in forming the barrel 21. An extension or lug 37 is formed on the inner barrel 32 and extends circumferentially outwardly therefrom for seating in the notch 36 to secure the barrels together against relative rotational movement and against vertical downward movement of the inner barrel. Fig. 3 of the drawing also brings out that the inner barrel 32 is longitudinally split and that aids in forming the lug 37 thereon and the camway 33 therein before such strip is rolled to tubular form to provide the desired inner barrel. The lug 37 is engaged in the notch 36 when the ends of the strip used to form the outer barrel 21 are brought together and since such notch margins are dovetailed, they are adapted to form a tight bond with the lug 37 and retain such lug in engagement with the notch permanently. A similar dovetailed notch 38 may be provided in the barrel 21 for engagement with a wedge-shaped lug 39 formed on the opposite end portion of the strip forming such barrel so that again a permanent connection is formed between the ends of such barrel forming member.

In use of the device of the invention, the bonnet nut on any given faucet would merely be removed and the old valve unit would be taken out of the faucet and discarded. Then the valve unit 11 could be positioned in the faucet body 12 and the proper amount of packing 31 could be inserted on the upper edges of the barrel means 21 and 32 so that drawing the bonnet nut tight will then force the gasket 25 tightly against the valve seat 17 and seal the gasket 25 and washer 23 and lower end of the barrel 21 together. It should be noted that the gasket 25 is substantially confined for sealing engagement with the lower portion of the washer 23. Usually the washer will be metallic and the valve 27 will be formed from resilient material since the metallic washer will serve to retain the gasket 25 in a given position and with the holes of the gasket and washer being aligned to facilitate fluid flow therethrough.

In Fig. 4 a portion of a modification of the invention is shown and such construction includes an outer tubular barrel 40 which has one or more outlets 41 formed in the sides thereof. A feature of the barrel 40 is that it has an integral valve seat 42 formed therein by means of a substantially frusto-conical, downwardly extending, apertured end or partition 43 formed at the lower end of the barrel 40. A gasket 44 is carried on the lower surface of such partition 43 and is retained in position by means of and extension flange 45 that also extends axially from the barrel 40 at the lower end thereof. This flange 45 is of the same diameter as the barrel 40 in most instances. A portion of a faucet 46 is indicated in Fig. 4 which illustrates how the gasket 44 would be brought into engagement with the valve seat formed at the end of the inlet channel 47 formed in such faucet 46. The drawings show how the gaskets 25 and 44 are substantially confined in operative position to prevent undesired flow of same. An inner barrel 48 is shown positioned in the barrel 40 and it has a lug 49 engaged with the outer barrel like the construction shown in the other figures of the drawings.

It also should be noted that the camway 33 may have laterally extending projections 33ᵃ formed at the lower ends thereof to aid in retaining the faucet 10 in shut-off position.

The lower portions of the partition 43 and the washer means 23 may be of the same construction like either construction shown herein.

While two complete embodiments of the invention have been disclosed herein, it will be appreciated that modification of these particular embodiments of the invention may be resorted to without departing from the scope of the invention as defined by the appended claims.

This application is a continuation in part of my application S. N. 717,869, filed December 23, 1946, since abandoned.

Having thus described my invention, what I claim is:

1. Valve mechanism for use in a faucet body having a neck at one end thereof and provided with a bore therethrough, the faucet body having a chamber of greater diameter than said bore extending from said neck and provided at the end opposed to said neck with an inlet channel having an annular seat surrounding the delivery end thereof within said chamber and opposed to said bore, the said chamber having an outlet between said seat and neck, said valve mechanism including a gasket for engaging with said seat and having a central bore therethrough, a washer having a valve seat positioned outwardly from the delivery end of the bore in said gasket, a valve stem member for extending through the said neck centrally thereof into said chamber of the faucet body and having its external surface radially spaced therefrom, an external sleeve adapted to be fitted within said neck and extended into said chamber, said external sleeve engaging said gasket and provided with at least one outlet communicating with said chamber when positioned in the faucet body, a packing-retaining nut through which the valve stem extends and which is adapted to be adjustably secured to the outer end of said neck, one or more packing members being positioned within said packing-retaining member surrounding the valve stem and engaging the adjacent end of said sleeve, an internal sleeve member within and secured to the external sleeve and terminating short of the outlet in said sleeve, one of said internal sleeve and valve stem members having an inclined cam track and the other of said members having a projection extending into said track, and a valve supported by the end of the valve stem member which is within the external sleeve and the chamber and adapted to be brought into and out of engagement with the washer valve seat by the travel of the projection along said track due to the rotation of said valve stem member, the external sleeve being longitudinally split and the internal sleeve member being secured thereto by a dovetailed notch formed in the end of the external sleeve which is outside the chamber and which is arranged symmetrically on opposite sides of the normally contacting ends of said sleeve and the inner sleeve member being provided on the exterior thereof and adjacent to the end thereof which is remote from the outlet in the external sleeve with a projection extending to a position within the said notch.

2. Valve mechanism for use in a faucet body having a neck at one end thereof and provided with a bore therethrough, the faucet body having a chamber of greater diameter than said bore extending from said neck and provided at the end opposed to said neck with an inlet channel having an annular seat surrounding the delivery end thereof within said chamber and opposed to said bore, the said chamber having an outlet between said seat and neck, said valve mechanism including a gasket for engaging with said seat and having a central bore therethrough, a washer having a valve seat positioned outwardly from the delivery end of the bore in said gasket, a valve stem member for extending through the said neck centrally thereof into said chamber of the faucet body and having its external surface radially spaced therefrom, an external sleeve adapted to be fitted within said neck and extended into said chamber, said external sleeve engaging said gasket and provided with at least one outlet communicating with said chamber when positioned in the faucet body, a packing-retaining nut through which the valve stem extends and which is adapted to be adjustably secured to the outer end of said neck, one or more packing members being positioned within said packing-retaining member surrounding the valve stem and engaging the adjacent end of said sleeve, a longitudinally split internal sleeve member within and secured to the external sleeve and terminating short of the outlet in said sleeve, one of said internal sleeve and valve stem members having an inclined cam track and the other of said members having a projection extending into said track, and a valve supported by the end of the valve stem member which is within the external sleeve and the chamber and adapted to be brought into and out of engagement with the washer valve seat by the travel of the projection along said track due to the rotation of said valve stem member, one of said sleeves having a projection associated therewith in the end of the same which is outside the chamber and the other said sleeve having a seating recess formed therein on an end thereof for receipt of said second projection.

3. A valve replacement unit for engaging a seat in a faucet comprising an outer tubular barrel having at least one side outlet opening into the lower end thereof, a gasket carried by the lower end of said barrel for seating on the seat of a faucet, apertured washer means associated with the lower end of said barrel and having the lower end engaged with said gasket, the upper end of said washer means forming a new valve seat for the unit, said barrel when secured in a valve body being adapted to be forced axially of the valve body towards the faucet seat therein to force said gasket thereagainst to seal same, an inner tubular barrel secured to and within said outer barrel at the upper end thereof, said inner barrel being retained against vertical downward and rotational movement by said outer barrel, said inner barrel having an inverted U-shaped camway formed therein, a valve stem extending through said inner barrel to a point adjacent said new valve seat, means for sealing against the upper ends of said inner and outer barrels, and a valve carried by the lower end of said valve stem to seat on said new valve seat, said valve stem being provided with an extension pin which engages with said camway so that arcuate movement of said valve stem will raise and lower said valve to and from seating engagement with said new valve seat.

4. A valve replacement unit for engaging a seat in a faucet comprising an outer tubular barrel having at least one side outlet opening in the lower end thereof, a gasket carried by the lower end of said barrel for seating on the seat of a faucet, apertured washer means associated with the lower end of said barrel and having the lower end engaged with said gasket, the upper end of said washer means forming a new valve seat for the unit, said barrel when secured in a valve body being adapted to be forced axially of the valve body towards the faucet seat therein to force said gasket thereagainst to seal same, an inner tubular barrel secured to and within said outer barrel at the upper end thereof, said inner barrel being retained against vertical downward and rotational movement by said outer barrel, a valve stem extending through said inner barrel to a point adjacent said new valve seat, means for sealing against the upper ends of said inner and outer barrels, and a valve carried by the lower end of said valve stem to seat on said new valve seat, one of said internal barrel and valve stem members having an inclined cam track and the other of said members having a projection extending into said track, said valve being adapted to be brought into and out of engagement with the seat on said washer member by the travel of the projection along said track due to the rotation of said valve stem member.

5. A valve structure for replacement of a valve mechanism in a faucet having a neck on the upper end thereof with a chamber therebelow and having an inlet channel with an annular seat on the top end thereof opposed to the neck, said valve structure comprising an outer barrel having at least one outlet opening in the lower end thereof, a gasket carried by the lower end of said barrel for seating on a seat of a faucet, an apertured washer member carried by the lower end of said barrel and having its lower surface engaged with said gasket, said gasket extending downwardly of the structure beyond said washer member, the upper end of said washer member forming a new valve seat for the apparatus and the lower end of such member having a gasket retaining flange formed thereon, said barrel when secured in a valve body being forced axially of the valve body towards the faucet seat to force said gasket thereagainst to seal same, an inner barrel secured to and within said outer barrel at the upper end thereof, said inner barrel being retained against vertical downward and rotational movement by said outer barrel, said inner barrel having an inverted U-shaped camway formed therein, a valve stem extending through said inner barrel to a point adjacent said new valve seat, and a valve carried by the lower end of said valve stem to seat on said new valve seat, said valve stem having an extension secured thereto and engaging with said camway whereby arcuate movement of said valve stem will raise and lower said valve to and from seating engagement with said new valve seat.

6. A valve structure for replacement of a valve mechanism in a faucet having a neck on the upper end thereof with a chamber therebelow and having an inlet channel with an annular seat on the top end thereof opposed to the neck, said valve structure comprising an outer tubular barrel having at least one side outlet opening in the lower end thereof, a gasket carried by the lower end of said barrel for seating on a seat of a faucet, an apertured frusto-conical gasket retaining member being formed on the lower end of said barrel and having its lower surface engaged with said gasket, said gasket retaining member extending downwardly of said barrel and having an annular retaining flange outlining same and extending downwardly of said barrel a portion of the length of such member as an extension of said barrel, an upper portion of said gasket retaining member forming a new valve seat for the apparatus, said barrel when secured in a valve body being forced axially of the valve body towards the faucet seat to force said gasket thereagainst to seal same, an inner tubular barrel secured to and within said outer barrel at the upper end thereof, said inner barrel being retained against vertical downward and rotational movement by said outer barrel, said inner barrel having a camway formed therein, a valve stem extending through said inner barrel to a point adjacent said new valve seat, and a valve carried by the lower end of said valve stem to seat on said new valve seat, said valve stem having an extension provided thereon and engaging with said camway whereby arcuate movement of said valve stem will raise and lower said valve to and from seating engagement with said new valve seat.

7. A valve structure for replacement of a valve mechanism in a faucet having a neck on the upper end thereof with a chamber therebelow and having an inlet channel with an annular seat on the top end thereof opposed to the neck, said valve structure comprising an outer tubular barrel having at least one side outlet opening in the lower end thereof, a gasket carried by the lower end of said barrel for seating on a seat of a faucet, an apertured frusto-conical gasket retaining member being formed on the lower end of said barrel and having its lower surface engaged with said gasket, an upper portion of said gasket retainer member forming a new valve seat for the apparatus, said barrel when secured in a valve body being forced axially of the valve body towards the faucet seat to force said gasket thereagainst to seal same, an inner tubular barrel secured to and within said outer barrel at the upper end thereof, said inner barrel being retained against vertical downward and rotational movement by said outer barrel, a valve stem extending through said inner barrel to a point adjacent said new valve seat, and a valve carried by the lower end of said valve stem to seat on said new valve seat, said gasket retaining member having a retaining cylindrical flange formed on and extending from its base to aid in retaining said gasket in a given position for engagement with a valve seat of a faucet, said valve stem and inner barrel having engaging cam means for varying the vertical position of said valve on arcuate movement of said valve stem.

8. A unit as in claim 4 wherein said inner barrel is longitudinally split and has a portion extending outwardly therefrom, said outer barrel having a notch therein for receiving said portion of said inner barrel to secure said barrels together.

9. In a valve unit, an outer barrel having a recess in the upper margin thereof, an inner barrel received in said outer barrel, said inner barrel being longitudinally split and having a projection formed on one portion thereof and engaged with said recess to secure said inner and outer barrels together, and valve means associated with said inner barrel and movable with relation thereto.

10. A valve unit as in claim 9 wherein said inner barrel has a substantially inverted U-shaped camway formed therein with laterally offset seating portions formed at the ends of the camway, and said valve means includes an extension pin engaged with said camway.

11. A valve unit as in claim 9 wherein said outer barrel is longitudinally split to provide side edges thereon, the upper side edges of said outer barrel being notched to combine to form an undercut recess receiving said projection to retain said inner barrel against relative outward movement with relation to said outer barrel.

12. A valve unit as in claim 9 wherein an integral valve seat is formed adjacent the lower end of said outer barrel which has a gasket engaging portion at its lower end, and an annular gasket positioned on the lower end of said outer barrel.

JACKSON L. WAITE.

References Cited in the file of this patent

UNITED STATES PATENTS

| Number | Name | Date |
|---|---|---|
| 1,155,576 | Isley | Oct. 5, 1915 |
| 1,431,701 | Sklaska | Oct. 10, 1922 |
| 1,526,921 | McNamara | Feb. 17, 1925 |
| 1,635,875 | Albrecht | July 12, 1927 |
| 1,669,651 | Bloch | May 15, 1928 |
| 1,730,601 | Brown | Oct. 8, 1929 |
| 1,988,966 | Eckhouse | Jan. 22, 1935 |
| 2,089,848 | Hoferle | Aug. 10, 1937 |